Dec. 31, 1935.  H. H. LAMPERT  2,026,509
LICENSE PLATE ORNAMENT
Filed Feb. 21, 1935
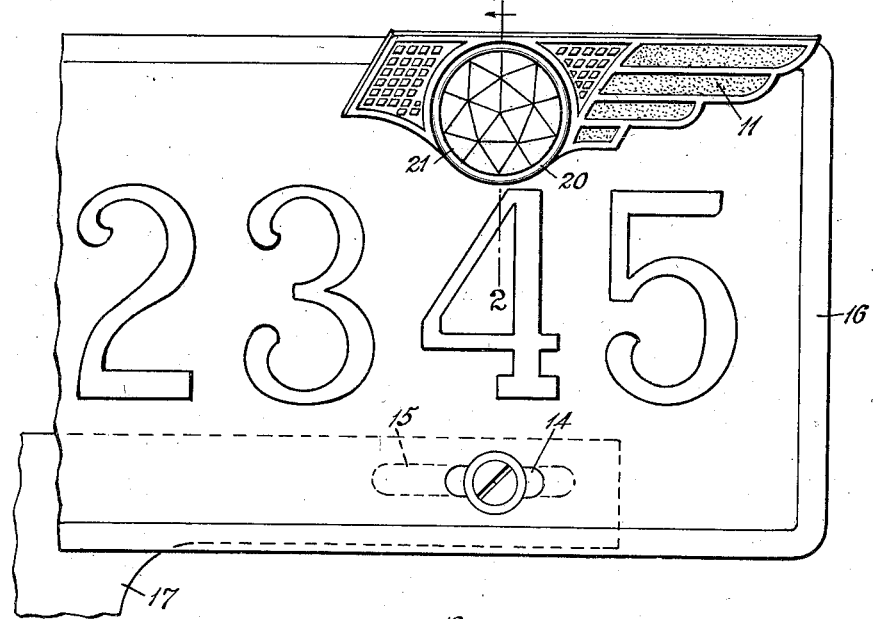
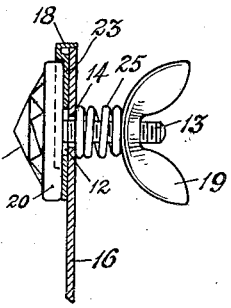
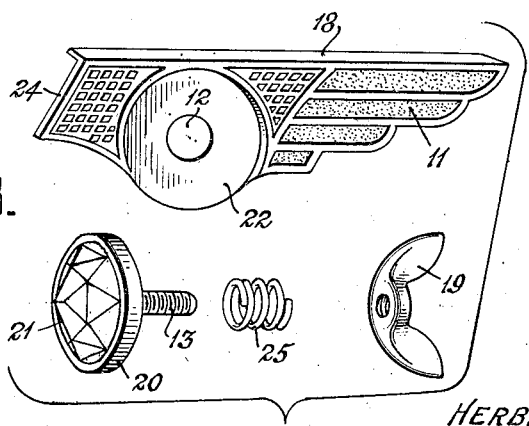
INVENTOR
HERBERT H. LAMPERT
BY
ATTORNEY Patented Dec. 31, 1935

2,026,509

UNITED STATES PATENT OFFICE 2,026,509

LICENSE PLATE ORNAMENT

Herbert H. Lampert, Brooklyn, N. Y., assignor to Kastar Specialty Mfg. Co., Inc., New York, N. Y., a corporation of New York Application February 21, 1935, Serial No. 7,570

4 Claims. (Cl. 40—125)

This invention relates to emblems or ornaments of the type applied to automotive vehicles and more particularly those emblems or ornaments which are intended to be applied to the conventional license plates which are present on every automotive vehicle.

An object of the invention is to provide an emblem of the above character in which are combined a plate member of suitable sheet material, such as aluminum, and an attaching means comprising a bolt of a size suitable to fit in the registering attaching slots of the license plate and supporting bracket conventionally provided at the rear end and/or front end of automotive vehicles, the bolt having at one end a wing nut for ready adjustment and having its visible end formed with a "jewel" of glass or other suitable material preferably faceted to reflect the light of approaching vehicles in such a manner as to constitute a warning to the driver of the approaching vehicle at night. The reflector jewel, in accordance with my invention, is secured within a bolt head adapted to be received and maintained within a depressed socket in the body portion of the plate member.

Another object of the invention is to provide the above-mentioned emblem plate with means to facilitate its easy application to the license plate in adjusted position, and its maintenance in such position relatively to the license plate, under the vibratory conditions encountered in the operation of the vehicle.

Other objects of the invention will be made to appear in the accompanying specification including the drawing, in which:

Fig. 1 is a view in front elevation of an emblem in the construction of which the invention has been embodied, the same being shown in position upon the license plate of an automotive vehicle;

Fig. 2 is a view in vertical section on the line 2—2 of Fig. 1;

Fig. 3 is a view, showing the components of the symbol ready for assembly with the license plate.

In the illustrative embodiment of the invention, the reference character 11 designates an emblem plate which, for the purpose of illustration, takes the form of a wing-like structure embossed in relief from sheet aluminum, and provided with an aperture 12 through which extends the shank 13 of an attaching bolt, the latter being of suitable size to fit in the conventional registering apertures 14 and 15 of the license plate 16 and the supporting bracket 17 of the vehicle, the latter being a rear bracket, although it will be understood that the emblem may be similarly affixed without change of structure, to a front license plate, or on any suitable supporting structure.

In pursuance of one of the objects of the invention, means 18 are provided, taking the form of an integral shoulder, ledge, or flange, which is adapted to fit along the margin of the license plate adjacent one corner thereof, serving to maintain the emblem in its adjusted position.

As a preferred form of attaching bolt, I have shown the free end of the shank 13 as threaded and furnished with a wing nut 19, the head 20 of the bolt being formed with a socket containing a "jewel" 21, formed of glass in the instance shown, and faceted to increase its reflective character.

In the preferred embodiment of my invention, the plate-member 11 is formed with a socket at 22 to seat the bolt-head, and the base 23 of this socket is adapted to rest against the face of the license-plate. The periphery of the plate-member may desirably be formed with a rearwardly extending flange or rim 24 similar to the shoulder, ledge, or flange 18, but of a height corresponding to the depth of the base 23 of the socket, so that this rim 24 cooperates with the socket base in maintaining the body of the plate-member level, the rim abutting against the face of the license plate in spaced relation to the socket base.

When the emblem plate is secured to the license plate, as shown in Fig. 2, a coil spring 25, surrounding the shank of the bolt 13 abuts against the under side of the license plate while the other end of the spring abuts against the wing nut.

When applied to the license plate, the emblem constitutes an attractive and useful attachment, in nowise interfering with the visibility of the legend on the license plate, and such an emblem may be provided at several corners of the license plate, the form shown being standard in the respect that any of the emblems may be attached to an upper or lower corner, by simple reversal, without change of structure, and may extend along the top, bottom, or either side, of the license plate.

Where several of the emblems are thus used, they serve as an attractive finish for the edge of the license plate, relieving the latter of the "raw" appearance usually exhibited by a license plate in the absence of a frame, and at a small fraction of the expense of such frames.

While an emblem in the form of a wing is an attractive embodiment of the invention, the latter may be equally well embodied in emblems of different design, and of any suitable dimensions.

By forming the plate-member 11 as an entity distinct from the bolt member, it is possible to manufacture the plate member in a variety of designs, any one or more of which may be purchased by a user, according to individual taste, the bolts with their jewelled warning heads being now available on the market, so that the cost of the emblems is desirably low.

My novel license plate emblem has the additional advantage of so off-setting the reflective jewel from the remaining area of the license plate that a definite contrast of colors, as between that of the jewel and that of the license plate, is obtained. This feature is of substantial importance as the primary function of the reflector jewel is to give information to the driver of an approaching vehicle and unless the color of the license plate is sufficiently contrasting to that of the jewel, the latter's intended function is impaired. By providing a plate member of the type described, carrying the reflector jewel in a markedly off-set relationship with the remaining portions of the plate member, a definite discontinuity of similar coloring between the jewel and the license plate, for instance, if the former is red, and the latter, a dark yellow, orange, or maroon, is obtained.

I claim:

1. In combination with a license plate having an aperture, of an emblem of the class described comprising a plate member having an aperture to receive an attaching bolt and an attaching bolt, said plate being adapted to overlie a marginal portion of the face of the license plate as well as a portion of the marginal edge of said license plate, with said bolt extending through both apertures of said plates, said bolt provided with an enlarged ornamental head part, and said plate member having its body portion circumjacent to said aperture formed with a socket to seat said bolt-head and having a rearwardly extending marginal flange around its entire periphery to a height corresponding to the base of the socket, the flange portion along at least one margin being of relatively greater height and adapted to extend over the margin of the supporting license plate, while the socket-base and lower flange portions abut against the face of the license plate.

2. As a new article of manufacture, an emblem plate of the class described, comprising a plate-member of sheet material embossed with any desired design and having a depressed socket apertured to receive a bolt, a portion of the periphery of the plate being formed into a rearwardly extending rim corresponding substantially in height to the base of the socket.

3. As a new article of manufacture, an emblem plate of the class described, comprising a plate-member of sheet material embossed with any desired design and having a depressed socket apertured to receive a bolt, the periphery of the plate being formed into a rearwardly extending rim corresponding in height to the base of the socket, said rim being further extended for a portion of its length to constitute a retaining shoulder, ledge or flange.

4. As a new article of manufacture, an emblem plate of the class described, comprising a plate-member having a depressed socket apertured to receive a bolt, at least a portion of the periphery of the plate being formed into a rearwardly extending rim, corresponding substantially to the height of the base of the socket, said rim being further extended for a portion of its length to constitute a retaining shoulder, ledge or flange.

HERBERT H. LAMPERT.